(12) United States Patent
VanDuyn et al.

(10) Patent No.: US 8,793,735 B2
(45) Date of Patent: Jul. 29, 2014

(54) METHODS AND APPARATUS FOR PROVIDING MULTIPLE CHANNEL RECALL ON A TELEVISION RECEIVER

(75) Inventors: Luke VanDuyn, Highlands Ranch, CO (US); Karen Michelle Taxler, Highlands Ranch, CO (US); Daniel L. Rudolph, Castle Rock, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 38 days.

(21) Appl. No.: 12/242,587

(22) Filed: Sep. 30, 2008

(65) Prior Publication Data
US 2010/0083310 A1    Apr. 1, 2010

(51) Int. Cl.
*G06F 3/00* (2006.01)
(52) U.S. Cl.
USPC .......... 725/46; 725/47; 725/52; 715/719
(58) Field of Classification Search
USPC .......... 725/38–61, 25, 27; 715/700, 716, 719
See application file for complete search history.

(56) References Cited

U.S. PATENT DOCUMENTS

| | | |
|---|---|---|
| 4,450,477 A | 5/1984 | Lovett |
| 4,725,888 A | 2/1988 | Hakamada |
| 4,739,510 A | 4/1988 | Jeffers et al. |
| 4,852,019 A | 7/1989 | Vinberg et al. |
| 4,868,785 A | 9/1989 | Jordan et al. |
| 5,187,776 A | 2/1993 | Yanker |
| 5,260,778 A | 11/1993 | Kauffman et al. |
| 5,428,734 A | 6/1995 | Haynes et al. |
| 5,438,372 A | 8/1995 | Tsumori et al. |
| 5,450,536 A | 9/1995 | Rosenberg et al. |
| 5,453,796 A | 9/1995 | Duffield et al. |
| 5,539,478 A | 7/1996 | Bertram et al. |
| 5,539,479 A | 7/1996 | Bertram |
| 5,545,857 A | 8/1996 | Lee et al. |
| 5,548,340 A | 8/1996 | Bertram |
| 5,559,961 A | 9/1996 | Blonder |
| 5,585,866 A | 12/1996 | Miller et al. |
| 5,589,893 A | 12/1996 | Gaughan et al. |
| 5,594,469 A | 1/1997 | Freeman et al. |
| 5,594,509 A * | 1/1997 | Florin et al. .......... 725/43 |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

International Search Report for PCT application PCT/US2009/058236, mailed on Dec. 2, 2009.

(Continued)

*Primary Examiner* — Farzana Hossain
(74) *Attorney, Agent, or Firm* — Ingrassia Fisher & Lorenz, P.C.

(57) ABSTRACT

The various embodiments described herein provide methods and apparatus for providing multiple channel recall on a television receiver. A television receiver stores multiple previously viewed channels for selective recall by a user. A television receiver outputs a selection menu that includes a plurality of previously viewed channels. A user selects one of the channels from the selection menu for viewing, and a tuner of the television receiver is commanded to output the selected channel.

15 Claims, 5 Drawing Sheets

(56) References Cited

U.S. PATENT DOCUMENTS

| | | | |
|---|---|---|---|
| 5,602,597 A | 2/1997 | Bertram | |
| 5,604,544 A | 2/1997 | Bertram | |
| 5,606,374 A | 2/1997 | Bertram | |
| 5,650,827 A | 7/1997 | Tsumori et al. | |
| 5,652,630 A | 7/1997 | Bertram et al. | |
| 5,659,369 A | 8/1997 | Imaiida | |
| 5,677,708 A | 10/1997 | Matthews, III et al. | |
| 5,682,489 A | 10/1997 | Harrow et al. | |
| 5,721,815 A | 2/1998 | Ottesen et al. | |
| 5,721,878 A | 2/1998 | Ottesen et al. | |
| 5,742,286 A | 4/1998 | Kung et al. | |
| 5,751,883 A | 5/1998 | Ottesen et al. | |
| 5,754,258 A | 5/1998 | Hanaya et al. | |
| 5,757,358 A | 5/1998 | Osga | |
| 5,767,840 A | 6/1998 | Selker | |
| 5,768,158 A | 6/1998 | Adler et al. | |
| 5,774,186 A | 6/1998 | Brodsky et al. | |
| 5,786,805 A | 7/1998 | Barry | |
| 5,805,235 A | 9/1998 | Bedard | |
| 5,808,601 A | 9/1998 | Leah et al. | |
| 5,809,265 A | 9/1998 | Blair et al. | |
| 5,815,216 A | 9/1998 | Suh | |
| 5,825,361 A | 10/1998 | Rubin et al. | |
| 5,831,591 A | 11/1998 | Suh | |
| 5,831,607 A | 11/1998 | Brooks | |
| 5,867,162 A | 2/1999 | O'Leary et al. | |
| 5,874,953 A | 2/1999 | Webster et al. | |
| 5,898,431 A | 4/1999 | Webster et al. | |
| 5,905,496 A | 5/1999 | Lau et al. | |
| 5,917,488 A | 6/1999 | Anderson et al. | |
| 5,917,489 A | 6/1999 | Thurlow et al. | |
| 5,936,623 A | 8/1999 | Amro | |
| 5,949,417 A | 9/1999 | Calder | |
| 5,956,025 A | 9/1999 | Goulden et al. | |
| 5,966,121 A | 10/1999 | Hubbell et al. | |
| 5,978,043 A | 11/1999 | Blonstein et al. | |
| 5,999,228 A | 12/1999 | Matsuura et al. | |
| 6,005,565 A | 12/1999 | Legall | |
| 6,008,735 A | 12/1999 | Chiloyan et al. | |
| 6,008,860 A | 12/1999 | Patton et al. | |
| 6,018,342 A | 1/2000 | Bristor | |
| 6,020,930 A | 2/2000 | Legrand | |
| 6,052,121 A | 4/2000 | Webster et al. | |
| 6,057,841 A | 5/2000 | Thurlow et al. | |
| 6,064,376 A | 5/2000 | Berezowski et al. | |
| 6,078,308 A | 6/2000 | Rosenberg et al. | |
| 6,088,029 A | 7/2000 | Guiberson et al. | |
| 6,118,442 A | 9/2000 | Tanigawa | |
| 6,118,498 A * | 9/2000 | Reitmeier | 348/725 |
| 6,125,374 A | 9/2000 | Terry et al. | |
| 6,141,003 A | 10/2000 | Chor et al. | |
| 6,147,714 A * | 11/2000 | Terasawa et al. | 348/564 |
| 6,173,112 B1 | 1/2001 | Gruse et al. | |
| 6,191,773 B1 | 2/2001 | Maruno et al. | |
| 6,208,341 B1 | 3/2001 | van Ee et al. | |
| 6,208,804 B1 | 3/2001 | Ottesen et al. | |
| 6,215,417 B1 | 4/2001 | Krass et al. | |
| 6,233,389 B1 | 5/2001 | Barton et al. | |
| 6,266,098 B1 | 7/2001 | Cove et al. | |
| 6,281,940 B1 | 8/2001 | Sciammarella | |
| 6,334,217 B1 * | 12/2001 | Kim | 725/38 |
| 6,493,036 B1 | 12/2002 | Fernandez | |
| 6,498,628 B2 | 12/2002 | Iwamura | |
| 6,526,577 B1 | 2/2003 | Knudson et al. | |
| 6,529,685 B2 | 3/2003 | Ottesen et al. | |
| 6,556,252 B1 | 4/2003 | Kim | |
| 6,650,248 B1 | 11/2003 | O'Donnell et al. | |
| 6,678,009 B2 | 1/2004 | Kahn | |
| 6,697,123 B2 | 2/2004 | Janevski et al. | |
| 6,750,803 B2 | 6/2004 | Yates et al. | |
| 6,750,887 B1 | 6/2004 | Kellerman et al. | |
| 6,774,914 B1 | 8/2004 | Benayoun | |
| 6,804,824 B1 * | 10/2004 | Potrebic et al. | 725/38 |
| 6,816,442 B1 | 11/2004 | Heiman et al. | |
| 6,822,698 B2 | 11/2004 | Clapper | |
| 6,882,712 B1 | 4/2005 | Iggulden et al. | |
| 6,934,963 B1 | 8/2005 | Reynolds et al. | |
| 6,943,845 B2 | 9/2005 | Mizutome et al. | |
| 7,046,161 B2 | 5/2006 | Hayes | |
| 7,061,544 B1 | 6/2006 | Nonomura et al. | |
| 7,148,909 B2 | 12/2006 | Yui et al. | |
| 7,171,622 B2 | 1/2007 | Bhogal | |
| 7,196,733 B2 | 3/2007 | Aratani et al. | |
| 7,206,029 B2 | 4/2007 | Cohen-Solal | |
| 7,225,456 B2 | 5/2007 | Kitsukawa et al. | |
| 7,231,603 B2 | 6/2007 | Matsumoto | |
| 7,268,830 B2 | 9/2007 | Lee | |
| 7,370,284 B2 | 5/2008 | Andrea et al. | |
| 7,420,620 B2 | 9/2008 | Habas et al. | |
| 7,434,246 B2 | 10/2008 | Florence | |
| 7,440,036 B2 | 10/2008 | Onomatsu et al. | |
| 7,584,492 B2 | 9/2009 | Terakado et al. | |
| 7,600,201 B2 | 10/2009 | Endler et al. | |
| 7,620,966 B2 | 11/2009 | Kitamori | |
| 7,636,131 B2 | 12/2009 | Hsieh et al. | |
| 7,707,599 B1 | 4/2010 | Groff et al. | |
| 7,746,332 B2 | 6/2010 | Le Leannec et al. | |
| 7,876,382 B2 | 1/2011 | Imaizumi | |
| 7,880,813 B2 | 2/2011 | Nakamura et al. | |
| 8,001,566 B2 | 8/2011 | Jang | |
| 8,005,826 B1 | 8/2011 | Sahami et al. | |
| 8,239,784 B2 | 8/2012 | Hotelling et al. | |
| 2001/0011953 A1 | 8/2001 | Shintani et al. | |
| 2001/0017672 A1 | 8/2001 | Verhaeghe | |
| 2002/0054062 A1 | 5/2002 | Gerba et al. | |
| 2002/0057382 A1 | 5/2002 | Yui | |
| 2002/0059599 A1 | 5/2002 | Schein et al. | |
| 2002/0060754 A1 | 5/2002 | Takeuchi | |
| 2002/0070957 A1 | 6/2002 | Trajkovic et al. | |
| 2002/0075333 A1 | 6/2002 | Dutta et al. | |
| 2002/0075407 A1 | 6/2002 | Cohen-Solal | |
| 2002/0097229 A1 | 7/2002 | Rose et al. | |
| 2002/0122027 A1 | 9/2002 | Kim | |
| 2002/0122079 A1 | 9/2002 | Kamen et al. | |
| 2002/0129366 A1 | 9/2002 | Schein et al. | |
| 2002/0174430 A1 | 11/2002 | Ellis et al. | |
| 2002/0178446 A1 | 11/2002 | Sie et al. | |
| 2002/0188948 A1 | 12/2002 | Florence | |
| 2002/0191954 A1 | 12/2002 | Beach et al. | |
| 2003/0001908 A1 | 1/2003 | Cohen-solal | |
| 2003/0005443 A1 | 1/2003 | Axelsson et al. | |
| 2003/0005445 A1 | 1/2003 | Schein et al. | |
| 2003/0018973 A1 | 1/2003 | Thompson | |
| 2003/0025716 A1 | 2/2003 | Colavin | |
| 2003/0066079 A1 | 4/2003 | Suga | |
| 2003/0086694 A1 | 5/2003 | Davidsson | |
| 2003/0115589 A1 | 6/2003 | D'Souza et al. | |
| 2003/0126607 A1 | 7/2003 | Phillips et al. | |
| 2003/0131356 A1 | 7/2003 | Proehl et al. | |
| 2003/0191947 A1 | 10/2003 | Stubblefield et al. | |
| 2003/0193426 A1 | 10/2003 | Vidal | |
| 2003/0208751 A1 | 11/2003 | Kim et al. | |
| 2004/0041723 A1 | 3/2004 | Shibamiya et al. | |
| 2004/0070593 A1 | 4/2004 | Neely et al. | |
| 2004/0107439 A1 | 6/2004 | Hassell et al. | |
| 2004/0111744 A1 * | 6/2004 | Bae et al. | 725/38 |
| 2004/0168191 A1 | 8/2004 | Jerding et al. | |
| 2004/0172651 A1 | 9/2004 | Wasilewski et al. | |
| 2004/0201780 A1 | 10/2004 | Kim | |
| 2004/0218905 A1 | 11/2004 | Green et al. | |
| 2004/0230843 A1 | 11/2004 | Jansen | |
| 2004/0255336 A1 | 12/2004 | Logan et al. | |
| 2005/0002649 A1 | 1/2005 | Boyle et al. | |
| 2005/0010949 A1 | 1/2005 | Ward et al. | |
| 2005/0015803 A1 | 1/2005 | Macrae et al. | |
| 2005/0076361 A1 | 4/2005 | Choi et al. | |
| 2005/0084233 A1 | 4/2005 | Fujii et al. | |
| 2005/0128366 A1 | 6/2005 | Cha | |
| 2005/0188402 A1 | 8/2005 | de Andrade et al. | |
| 2005/0190280 A1 | 9/2005 | Haas et al. | |
| 2005/0251826 A1 | 11/2005 | Orr | |
| 2005/0268100 A1 | 12/2005 | Gasparini et al. | |
| 2006/0037047 A1 | 2/2006 | DeYonker et al. | |
| 2006/0051058 A1 | 3/2006 | Rudolph et al. | |

(56) References Cited

U.S. PATENT DOCUMENTS

| | | |
|---|---|---|
| 2006/0061668 A1 | 3/2006 | Ise |
| 2006/0061688 A1 | 3/2006 | Choi |
| 2006/0064700 A1 | 3/2006 | Ludvig et al. |
| 2006/0084409 A1 | 4/2006 | Ghadiali |
| 2006/0095401 A1 | 5/2006 | Krikorian et al. |
| 2006/0184900 A1 | 8/2006 | Ishii et al. |
| 2006/0236342 A1 | 10/2006 | Kunkel et al. |
| 2007/0019111 A1 | 1/2007 | Won |
| 2007/0039019 A1 | 2/2007 | Collier |
| 2007/0039020 A1 | 2/2007 | Cansler, Jr. et al. |
| 2007/0061724 A1 | 3/2007 | Slothouber et al. |
| 2007/0074254 A1 | 3/2007 | Sloo |
| 2007/0079334 A1 | 4/2007 | Silver |
| 2007/0115391 A1 | 5/2007 | Anderson |
| 2007/0130607 A1 | 6/2007 | Thissen et al. |
| 2007/0186231 A1* | 8/2007 | Haeuser et al. ............ 725/25 |
| 2007/0192791 A1 | 8/2007 | Sullivan et al. |
| 2007/0195197 A1 | 8/2007 | Seong et al. |
| 2007/0199022 A1 | 8/2007 | Moshiri et al. |
| 2007/0266397 A1 | 11/2007 | Lin |
| 2007/0277224 A1 | 11/2007 | Osborn et al. |
| 2008/0010518 A1 | 1/2008 | Jiang et al. |
| 2008/0024682 A1 | 1/2008 | Chen |
| 2008/0034314 A1 | 2/2008 | Louch et al. |
| 2008/0052245 A1 | 2/2008 | Love |
| 2008/0066102 A1 | 3/2008 | Abraham et al. |
| 2008/0074550 A1 | 3/2008 | Park |
| 2008/0088495 A1 | 4/2008 | Kawakita |
| 2008/0129886 A1 | 6/2008 | Ishihara |
| 2008/0147803 A1 | 6/2008 | Krzyzanowski et al. |
| 2008/0184324 A1 | 7/2008 | Yun et al. |
| 2008/0222523 A1 | 9/2008 | Fox et al. |
| 2008/0229254 A1 | 9/2008 | Warner |
| 2008/0231762 A1 | 9/2008 | Hardacker et al. |
| 2008/0235735 A1 | 9/2008 | Wroblewski |
| 2008/0263595 A1 | 10/2008 | Sumiyoshi et al. |
| 2009/0007209 A1 | 1/2009 | Kawai |
| 2009/0031335 A1 | 1/2009 | Hendricks et al. |
| 2009/0031343 A1 | 1/2009 | Sharkey |
| 2009/0070815 A1 | 3/2009 | Barrett et al. |
| 2009/0141024 A1 | 6/2009 | Lee et al. |
| 2009/0241145 A1 | 9/2009 | Sharma |
| 2010/0037180 A1 | 2/2010 | Elias et al. |
| 2010/0050199 A1 | 2/2010 | Kennedy |
| 2010/0100909 A1 | 4/2010 | Arsenault et al. |
| 2010/0115550 A1 | 5/2010 | Minnick et al. |
| 2010/0118211 A1 | 5/2010 | Carlsgaard et al. |
| 2010/0169958 A1 | 7/2010 | Werner et al. |
| 2010/0231525 A1 | 9/2010 | Chen |
| 2011/0018817 A1 | 1/2011 | Kryze et al. |

FOREIGN PATENT DOCUMENTS

| | | |
|---|---|---|
| TW | 200729167 | 1/2007 |
| WO | 0001142 | 1/2000 |
| WO | 0001142 A1 | 1/2000 |
| WO | WO 00/01142 A1 | 1/2000 |
| WO | 0178054 A1 | 10/2001 |
| WO | 0178383 A2 | 10/2001 |
| WO | 03043320 A2 | 5/2003 |
| WO | 2006127211 A2 | 11/2006 |
| WO | 20060119269 A2 | 11/2006 |
| WO | 20070015047 A2 | 2/2007 |
| WO | WO 2007/024502 A2 | 3/2007 |
| WO | 2008013350 A2 | 1/2008 |
| WO | WO 2008/013350 A2 | 1/2008 |

OTHER PUBLICATIONS

International Searching Authority, European Patent Office, "International Search Report," mailed Dec. 7, 2009; International Application No. PCT/US2009/058457, filed Sep. 25, 2009.

International Searching Authority, European Patent Office, "International Search Report and Written Opinion," mailed Dec. 18, 2009; International Application No. PCT/US2009/058456, filed Sep. 25, 2009.

International Searching Authority, European Patent Office, "International Search Report and Written Opinion," mailed Dec. 21, 2009; International Application No. PCT/US2009/058454 filed Sep. 25, 2009.

Anonymous "ZigBee," Wikipedia, the Free Encyclopedia [online], Sep. 26, 2008, XP002558439; retrieved from the Internet: <URL:http://en.wikipedia.org/w/index.php?title=ZigBee &oldid=241085798> [retrieved on Dec. 2, 2009].

Nintendo, "Wii Operations Manual System Setup," 2007.

Wikipedia, the free encyclopedia, "Dashboard (Software," Retrieved from the Internet on Oct. 6, 2008, http://en.wikipedia.org/w/index.php?title=Dashboard_(software)&printable=yes.

International Searching Authority, European Patent Office, "International Search Report," mailed Jan. 20, 2010; International Application No. PCT/US2009/057825 filed Sep. 22, 2009.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

VanDuyn, Luke et al. "Systems and Methods for Graphical Control of Picture-In-Picture Windows," U.S. Appl. No. 12/241,571, filed Sep. 30, 2008.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of an Electronic Program Guide," U.S. Appl. No. 12/241,608, filed Sep. 30, 2008.

VanDuyn, Luke et al. "Methods and Apparatus for Presenting Supplemental Information in an Electronic Programming Guide," U.S. Appl. No. 12/235,476, filed Sep. 22, 2008.

Taxier, Karen Michelle et al. "Methods and Apparatus for Visually Displaying Recording Timer Information," U.S. Appl. No. 12/235,464, filed Sep. 22, 2008.

Martch, Henry Gregg et al. "Methods and Apparatus for Locating Content in an Electronic Programming Guide," U.S. Appl. No. 12/242,614, filed Oct. 17, 2008.

Taxier, Karen Michelle et al. "Apparatus and Methods for Dynamic Pictorial Image Authentication," U.S. Appl. No. 12/236,430, filed Sep. 23, 2008.

Minnick, Danny Jean et al., "Graphical Interface Navigation Based on Image Element Proximity," U.S. Appl. No. 12/609,860, filed Oct. 30, 2009.

International Searching Authority, European Patent Office, "International Search Report," mailed Feb. 4, 2010; International Application No. PCT/US2009/058937, filed Sep. 30, 2009.

International Searching Authority, European Patent Office, "International Search Report," mailed Feb. 16, 2010; International Application No. PCT/US2009/057582, filed Sep. 18, 2009.

Wightman, Robert, Edward, U.S. Appl. No. 12/233,274, filed Sep. 18, 2008.

USPTO "Non-Final Office Action" mailed Feb. 9, 2011; U.S. Appl. No. 12/241,608, filed Sep. 30, 2008.

USPTO "Non-Final Office Action" mailed Jan. 12, 2011; U.S. Appl. No. 12/241,580, filed Sep. 30, 2008.

USPTO "Non-Final Office Action" mailed Jan. 28, 2011; U.S. Appl. No. 12/236,430, filed Sep. 23, 2008.

USPTO "Non-Final office Action" mailed Feb. 4, 2011; U.S. Appl. No. 12/241,599, filed Sep. 30, 2008.

(56) References Cited

OTHER PUBLICATIONS

USPTO "Non-Final Office Action" mailed Dec. 21, 2010; U.S. Appl. No. 12/235,476, filed Sep. 22, 2008.
USPTO "Non-Final Office Action" mailed Mar. 31, 2011; U.S. Appl. No. 12/241,556, filed Sep. 30, 2008.
USPTO "Non-Final Office Action" mailed Dec. 6, 2011; U.S. Appl. No. 12/241,580, filed Sep. 30, 2008.
USPTO "Final Office Action" mailed Dec. 7, 2011; U.S. Appl. No. 12/241,599, filed Sep. 30, 2008.
USPTO "Non-Final Office Action" mailed Nov. 23, 2011; U.S. Appl. No. 12/242,614, filed Sep. 30, 2008.
USPTO "Non-Final Office Action" mailed Mar. 7, 2012; U.S. Appl. No. 12/235,464, filed Sep. 22, 2008.
USPTO "Non-Final Office Action" mailed Mar. 22, 2012; U.S. Appl. No. 12/241,556, filed Sep. 30, 2008.
USPTO "Non-Final Office Action" mailed Apr. 17, 2012; U.S. Appl. No. 12/241,608, filed Sep. 30, 2008.
USPTO "Non-Final Office Action" mailed Jul. 6, 2011; U.S. Appl. No. 12/241,571, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed Jun. 23, 2011; U.S. Appl. No. 12/241,580, filed Sep. 30, 2008.
USPTO "Final Office Action" mailed May 13, 2011; U.S. Appl. No. 12/235,476, filed Sep. 22, 2008.
USPTO "Non-Final Office Action" mailed Jan. 31, 2011; U.S. Appl. No. 12/233,274, filed Sep. 18, 2008.
The International Bureau of WIPO "Notification Concerning Transmittal of International Preliminary Report on Patentability (Chapter 1 of the Patent Cooperation Treaty)" mailed Apr. 14, 2011; International Appln. No. PCT/US2009/058236, filed Sep. 24, 2009.
USPTO "Final Office Action" mailed Jul. 28, 2011; U.S. Appl. No. 12/241,608, filed Sep. 30, 2008.
USPTO "Final Office Action" mailed Aug. 18, 2011; U.S. Appl. No. 12/233,274, filed Sep. 18, 2008.
United States Patent and Trademark Office "Final Office Action" mailed Aug. 26, 2011, for U.S. Appl. No. 12/241,599, filed Sep. 30, 2008.
United States Patent and Trademark Office "Final Office Action" mailed Oct. 5, 2011, for U.S. Appl. No. 12/241,556, filed Sep. 30, 2008.
USPTO "Final Office Action" mailed Oct. 21, 2011; U.S. Appl. No. 12/241,571, filed Sep. 30, 2008.
USPTO "Final Office Action" mailed Jan. 20, 2012; U.S. Appl. No. 12/241,604, filed Sep. 30, 2008.
USPTO "Final Office Action" mailed Apr. 25, 2012; U.S. Appl. No. 12/242,614, filed Sep. 30, 2008.
USPTO "Non-Final Office Action" mailed Apr. 24, 2012; U.S. Appl. No. 12/235,476, filed Sep. 22, 2008.
USPTO "Final Office Action" mailed Aug. 8, 2012 for U.S. Appl. No. 12/241,556, filed Sep. 30, 2008.
USPTO "Non-Final Office Action" mailed Jun. 28, 2012 for U.S. Appl. No. 12/241,571, filed Sep. 30, 2008.
USPTO "Non-Final Office Action" mailed Jul. 26, 2012 for U.S. Appl. No. 12/609,860, filed Oct. 30, 2009.
USPTO "Final Office Action" mailed Aug. 2, 2012 for U.S. Appl. No. 12/241,599, filed Sep. 30, 2008.
USPTO "Final Office Action" mailed Jul. 17, 2012 for U.S. Appl. No. 12/241,580, filed Sep. 30, 2008.
USPTO "Final Office Action" mailed Aug. 1, 2012 for U.S. Appl. No. 12/241,608, filed Sep. 30, 2008.
USPTO "Final Office Action" mailed Aug. 9, 2012 for U.S. Appl. No. 12/235,476, filed Sep. 22, 2008.
Intellectual Property Office "Office Action" issued Oct. 25, 2012 for Taiwan Patent Appln. No. 098127906.
Ntellectual Property Office "Office Action" issued Oct. 30, 2012 for Taiwan Patent Appln. No. 098127902.
USPTO "Notice of Allowance" mailed Nov. 6, 2012 for U.S. Appl. No. 12/24,599, filed Sep. 30, 2008.
USPTO "Final Office Action" mailed Nov. 13, 2012 for U.S. Appl. No. 12/609,860, filed Oct. 30, 2009.
USPTO "Final Office Action" mailed Nov. 13, 2012 for U.S. Appl. No. 12/24,571, filed Sep. 30, 2008.
USPTO "Non' Final Office Action" mailed Nov. 15, 2012 for U.S. Appl. No. 12/241,608, filed Sep. 30, 2008.
USPTO "Non-Final Office Action" mailed Dec. 5, 2012 for U.S. Appl. No. 12/24,556, filed Sep. 30, 2008.
USPTO "Final Office Action" mailed Oct. 9, 2012 for U.S. Appl. No. 12/235,464, filed Sep. 22, 2008.
USPTO "Final Office Action" mailed Jan. 23, 2013 for U.S. Appl. No. 12/241,604, filed Sep. 30, 2008.
USPTO, "Notice of Allowance and Fee(s) Due" mailed May 7, 2013 for U.S. Appl. No. 12/241,608, filed Sep. 30, 2008.
USPTO "Non'Final Office Action" mailed Feb. 12, 2013 for U.S. Appl. No. 12/235,476.
USPTO, "Office Action" mailed Sep. 11, 2013 for U.S. Appl. No. 12/241,556.
USPTO, "Notice of Allowance and Fee(s) Due" mailed Sep. 13, 2013 for U.S. Appl. No. 12/235,464.
USPTO, "Final Office Action" mailed Dec. 4, 2013 for U.S. Appl. No. 12/241,604.
USPTO, "Office Action", mailed Sep. 25, 2013 for U.S. Appl. No. 12/609,860.
USPTO, "Final Office Action" mailed Jun. 7, 2013 for U.S. Appl. No. 12/241,556.
USPTO, "Office Action" mailed Aug. 9, 2013 for U.S. Appl. No. 12/241,580.
USPTO, "Notice of Allowance" mailed Aug. 14, 2013 for U.S. Appl. No. 12/235,476.
USPTO, "Office Action" mailed Aug. 19, 2013 for U.S. Appl. No. 12/241,604.

* cited by examiner

METHODS AND APPARATUS FOR PROVIDING MULTIPLE CHANNEL RECALL ON A TELEVISION RECEIVER

BACKGROUND

Television receivers typically include a feature for recalling a previously viewed channel. The television receiver remembers the last previously viewed channel, which may be accessed through the recall function. Remote controls associated with television receivers include a recall button that toggles between two channels, i.e., a presently viewed channel and a previously viewed channel. Thus, a user may toggle between watching two different programs with the press of a single button. After actuation of the recall button, the presently viewed channel becomes the previously viewed channel, and vice versa.

A recall button is useful for viewers that desire to alternate between watching two programs. For example, a user may toggle between channels 24 and 57 of the television receiver. However, the user is limited to alternating between the two channels. If the user switches the television receiver from channel 57 to channel 10, then channel 24 may no longer be accessed using the recall button. Rather, the recall button toggles the television receiver between channels 57 and 10 until the user switches to another channel besides 57 or 10. Thus, the user's viewing experience is limited based on the configuration of the recall button.

BRIEF DESCRIPTION OF THE DRAWINGS

The same number represents the same element or same type of element in all drawings.

DETAILED DESCRIPTION

The various embodiments described herein generally provide apparatus, systems and methods which facilitate a user's navigation through channels of a television receiver. More particularly, the various embodiments described herein provide television receivers that store multiple previously viewed channels for selective recall by a user. A user selects one of the previously viewed channels for viewing, and the television receiver changes the outputted channel accordingly. In short, the various embodiments described herein provide multiple channel recall on a television receiver.

In at least one embodiment, a television receiver outputs a selection menu that includes a plurality of previously viewed channels. A user selects one of the channels from the selection menu for viewing, and a tuner of the television receiver is commanded to decode and output the selected channel. In some embodiments, a subset of the previously viewed channels of the selection menu may be highlighted, and a user may provide input to navigate through the subset of previously viewed channels. For example, the subset may include a previously viewed channel and a presently viewed channel, and a user may be able to toggle between the two channels. A user may provide further input to modify the subset of the channels, such that the user may navigate and/or toggle through the modified subset of channels.

Figure 1:
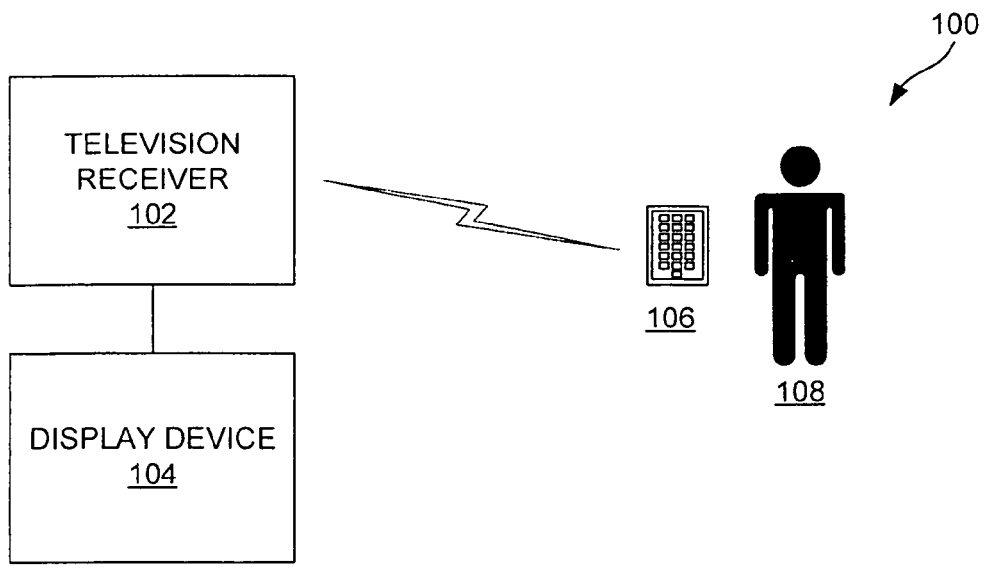
FIG. 1 illustrates an embodiment of an entertainment system.

FIG. 1 illustrates an embodiment of an entertainment system 100. The entertainment system 100 presents content to a user 108. In at least one embodiment, the content presented to the user 108 includes an audio/video stream, such as a television program, movie or other recorded content and the like. The entertainment system 100 includes a television receiver 102, a display device 104 and a remote control 106. Each of these components is discussed in greater detail below. The entertainment system 100 may include other devices, components or elements not illustrated for the sake of brevity.

The television receiver 102 is operable to receive content from one or more content sources (not shown in FIG. 1), and to output the received content for presentation by the display device 104. More particularly, the television receiver 102 is operable to receive and demodulate a television signal from a programming source, such as a satellite, cable, internet, terrestrial or other type of television transmission signal. The television receiver 102 may receive an audio/video stream in any format (e.g., analog or digital format). Likewise, the television receiver 102 may output the audio/video stream for presentation by the display device 104 in any type of format. In at least one embodiment, the television receiver 102 is a set-top box (e.g., a satellite or cable television converter box), digital video recorder (DVR) or other similar device that processes and provides one or more audio and/or video output streams to the display device 104 for presentation to the user 108. The television receiver 102 may be further configured to output for display menus and other information that allow a user 108 to control the output of content by the television receiver 102. For example, as described in further detail below, the television receiver 102 may output menus of previously viewed channels to provide multiple channel recall functionality to the user 108.

The display device 104 may comprise any type of device capable of receiving and outputting a video signal in any format. Exemplary embodiments of the display device 104 include a television, computer monitor, liquid crystal display (LCD) screen, touch screen and projector. The display device 104 and television receiver 102 may be communicatively coupled through any type of wired or wireless interface. For example, the display device 104 may be communicatively coupled to the television receiver 102 through a coaxial cable, component or composite video cables, an HDMI cable, a VGA or SVGA cable, a Bluetooth or WiFi wireless connection or the like. In at least one embodiment, the television receiver 102 and the display device 104 may be integrated as a device combining the functionality of a display device and a set-top box, digital video recorder (DVR) or the like.

The remote control 106 may comprise any system or apparatus configured to remotely control the output of content by the television receiver 102. The remote control 106 may minimally include a transmitter, an input device (e.g., a keypad) and a processor for controlling the operation of the remote control 106. The remote control 106 may communicate commands to the television receiver 102 requesting to playback content, temporally move through content (e.g., fast-forward or reverse), adjust the volume, access electronic programming guides and the like. In some embodiments, the remote control 106 may additionally be configured to remotely control the display device 104. The remote control 106 may communicate with the television receiver 102 and/or the display device 104 through any type of wireless communication medium, such as infrared (IR) signals or radio-frequency (RF) signals.

The remote control 106 may include any type of man-machine interface for receiving input from the user 108. For example, the remote control 106 may include buttons for receiving input from the user 108. In at least one embodiment, the remote control 106 includes a touch pad for receiving input from the user 108. The remote control 106 may further include a trigger, utilized in association with the touch pad, for allowing the user to input information associated with the menus displayed on-screen.

During a viewing session, the user 108 requests to view one or more channels accessible through the television receiver 102. The user 108 may request to access these through a variety of techniques. Exemplary techniques for requesting to view a particular channel include directly entering a channel number, e.g., 140, utilizing a channel up/down button of the remote control 106 to navigate channels, selecting a channel in an electronic programming guide (EPG), selecting a channel from a list of favorite channels and utilizing a recall function of the television receiver 102. As the user 108 navigates through the channels of the television receiver 102, the television receiver 102 maintains a list of channels previously viewed by the user 108.

In at least one embodiment, the number of previously viewed channels stored in memory may be a pre-defined number (N). In other words, the television receiver 102 may maintain a first-in-first-out (FIFO) in memory reflecting the last N channel changes. For example, if N is five, and the user 108 views channels 14, 57, 23, 73, 2, 6, 8, and 9, respectively, then the television receiver 102 would store 8, 6, 2, 73 and 23 in memory. It is to be appreciated that the contents of the FIFO memory may change each time the television receiver 102 changes channels. Thus, if the user 108 switches from channel 9 to channel 3, then the content of the memory may subsequently store 9, 8, 6, 2 and 73.

However, often a user 108 doesn't switch between five unique channels. Rather, the user 108 may repeatedly switch back to the same channel or channels during the viewing session. For example, a user 108 may initially watch channel 3, switch to channel 27, return back to channel 3, switch to channel 4, return to channel 3, switch to channel 10, return to channel 3, switch to channel 50, return to channel 3 and then switch to channel 13. If the television receiver 102 maintained a list of the last N channel changes, where N is equal to five, then channel 3 would represent three of the five previously viewed channels when the user 108 is viewing channel 13. However, in at least one embodiment, the television receiver 102 may maintain a list of N previously viewed unique channels. For example, in the aforementioned example, the television receiver 102 may store the previously viewed channels, 3, 50, 10, 4 and 27 while the user 108 is viewing channel 13.

The list of previously viewed channels may be stored as a modified FIFO buffer. Rather than overwriting the first channel in the buffer, the television receiver 102 may overwrite the least recently accessed channel in the buffer. Thus, if a channel farther down in the buffer is subsequently accessed, the channel is moved from its previous spot to the top of the buffer, reflecting that the channel was more recently accessed than other channels within the list of previously viewed channels.

In some embodiments, the list of previously accessed channels may be initialized upon activation of a new viewing session. In other words, each time the television receiver 102 powers off/on, the list of previously viewed channels may be erased. In other embodiments, the list of previously accessed channels may carry over between viewing sessions.

To recall a previously viewed channel, the user 108 actuates the recall functionality of the television receiver 102. For example, the recall function may be actuated through a button on the television receiver 102 or may be accessed through a button/switch or the like of the remote control 106. The television receiver 102 then allows the user 108 to navigate through the list of previously viewed channels (or a subset thereof) to select a particular channel for viewing.

In at least one embodiment, the television receiver 102 outputs a selection menu of previously viewed channels. The user 108 utilizes the remote control 106 to select one of the previously viewed channels for viewing. For example, the selection menu may include a numeric identifier (e.g., 1-5) identifying each of the previously viewed channels. A user 108 may then press a numeric key of the remote control 106 to select a particular previously viewed channel for viewing. The television receiver 102 then responsively tunes and outputs the selected channel for display by the display device 104.

In some embodiments, the selection menu outputted by the television receiver 102 may include a manipulatable cursor that the user 108 utilizes to select a particular channel of the selection menu. For example, the remote control 106 may include arrow keys, a touch pad or the like that the user 108 utilizes to select a particular previously viewed channel for viewing.

Figure 2:
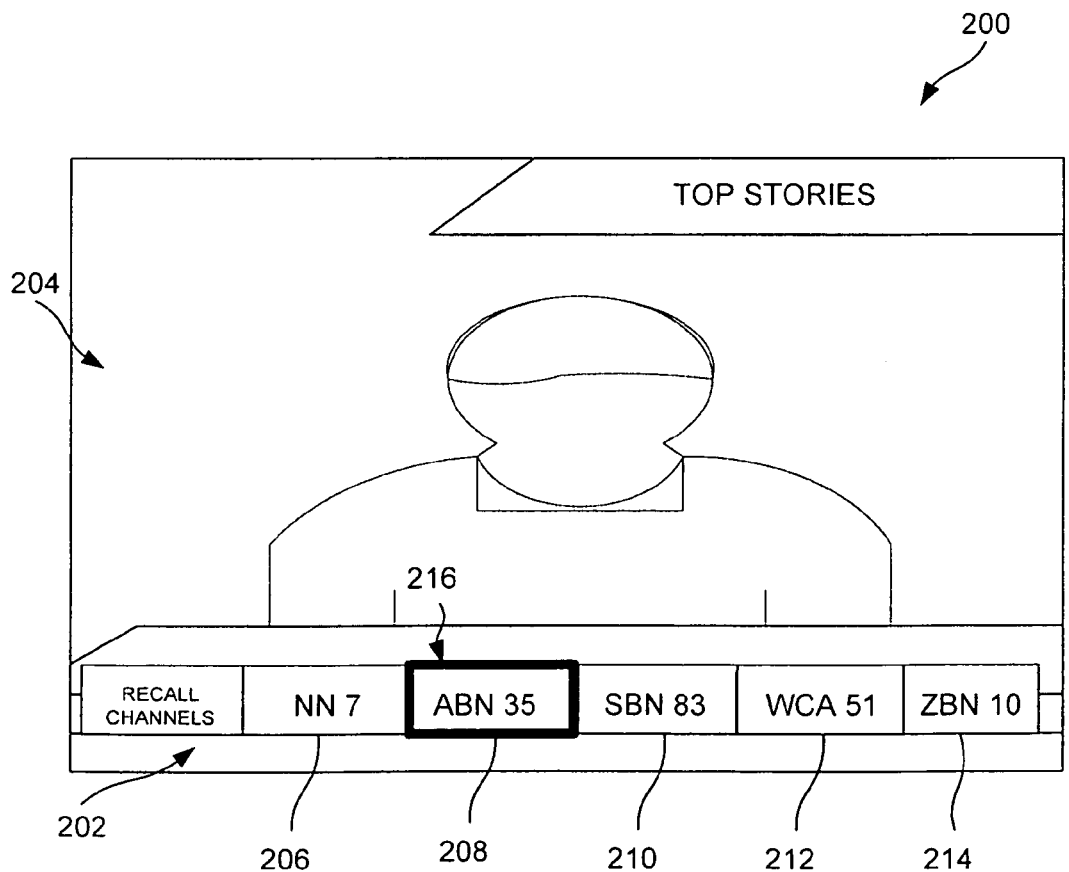
FIG. 2 illustrates an embodiment of a screenshot of a selection menu.

FIG. 2 illustrates an embodiment of a screenshot 200 of a selection menu 202. FIG. 2 will be discussed in reference to the entertainment system 100 of FIG. 1. The user 108 utilizes the remote control 106 to activate the recall function. For example, the user 108 may press a recall button of the remote control 106 or make a movement along a touch pad of the remote control 106. Responsive to activation of the recall function, the television receiver 102 outputs the selection menu 202.

The selection menu 202 is overlaid on the video data 204 of a presently viewed channel. As illustrated in the screenshot 200, each previously viewed channel may be represented by an icon 206-214 associated with the channel. Further, the selection menu 202 includes a cursor 216 highlighting one of the previously viewed channels. In the illustrated embodiment, a user 108 utilizes the remote control 106 to manipulate the position of the cursor 216 to select one of the previously viewed channels. For example, the user 108 may provide input to a touch pad of the remote control 106 to manipulate the cursor 216. Responsive to receiving a user selection from the selection menu 202, the television receiver 102 tunes and outputs the selected channel indicated by the position of the cursor.

In some embodiments, the television receiver 102 may change the channel responsive to movement of the cursor 216. In other words, as the position of the cursor 216 moves, the television receiver 102 switches the channel outputted for display by the display device. In at least one embodiment, the user 108 manipulates a position of the cursor 216 by providing a first user input, and makes a selection of a particular channel by providing a second user input. For example, a user 108 may move the position of the cursor 216 using a touch pad of the remote control 106, and the user may select a particular previously viewed channel utilizing a trigger of the remote control 106.

Figure 3:
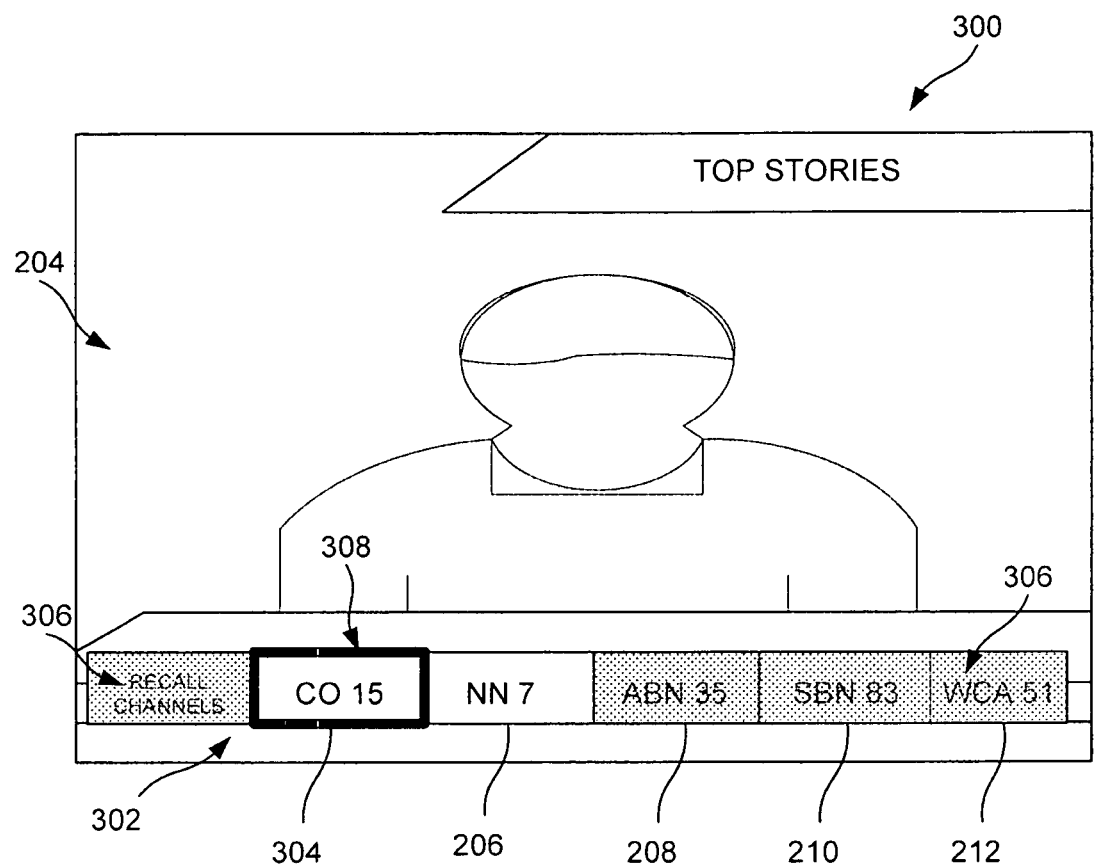
FIG. 3 illustrates an embodiment of a screenshot including a selection menu of a subset of previously viewed channels.

In some embodiments, the television receiver 102 may store a plurality of previously viewed channels, and may allow the user 108 to navigate a subset of the plurality of previously viewed channels. In at least one embodiment, the subset navigation feature may be activated based upon user input received from the user 108. FIG. 3 illustrates an embodiment of a screenshot 300 including a selection menu 302 of a subset of previously viewed channels. FIG. 3 will be discussed in reference to the entertainment system 100 of FIG. 1.

The selection menu 302 is similar to the selection menu 202 of FIG. 2. More particularly, the selection menu 302 includes icons 206-214 representing four previously viewed channels. In the described embodiment, the channels associated with icons 206-212 are sorted from left-to-right in the order of viewing of the channels. The most recent previously viewed channel is represented by icon 206, and the least recent previously viewed channel is represented by icon 212.

The selection menu 302 further includes an icon 304 representing a presently viewed channel. As illustrated in screenshot 300, a visual indicator 306 highlights a subset of the previously viewed channels. More particularly, the visual indicator 306 highlights the icon 304 representing the presently viewed channel and the icon 206 representing the most recent previously viewed channel. The visual indicator 306 highlights the icons 206 and 304 by graying out the other icons in the selection menu 302, thus, drawing attention to the icons 206 and 304. The graying out of the other previously viewed channels indicates that they are not part of the subset of channels navigable in the selection menu 302. It is to be appreciated that other types of visual indicators 306 may be utilized instead to highlight a subset of channels in the selection menu 302. Initially, a cursor 308 highlights the icon 304. The user 108 may then provide user input to manipulate a position of the cursor 308 to navigate the subset of the previously viewed channels. In at least one embodiment, the position of the cursor 308 determines the particular previously viewed channel to be outputted by the television receiver 102. Thus, if the subset includes two channels, i.e., the presently viewed channel and a previously viewed channel, then the user 108 may toggle between the two channels by providing input to the remote control 106. For example, the user 108 may provide input by scrolling along a touch pad of the remote control 106. It is to be appreciated that the subset of previously viewed channels may include any number M of the N previously viewed channels.

In at least one embodiment, the user 108 may provide user input to change the composition of the subset of the previously viewed channels in the selection menu 302. For example, the user 108 may provide input via an arrow pad, button or the like to change the composition of the subset of previously viewed channels by moving the location of the visual indicator 306. In other embodiments, the user 108 may activate checkboxes associated with the icons 206-214 and 304 to indicate which channels are part of the subset of previously viewed channels in the selection menu 302. Changing the composition of the subset may also include changing the size of the subset of previously viewed channels.

Figure 4:
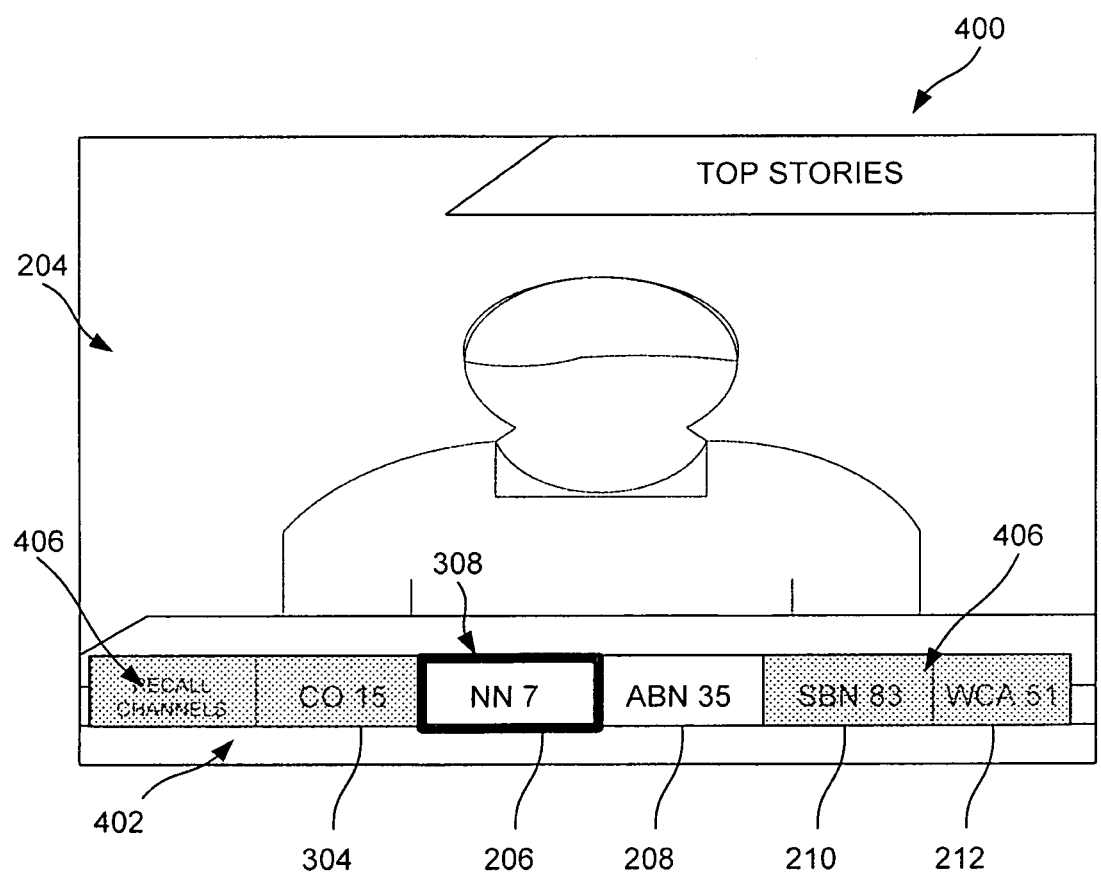
FIG. 4 illustrates an embodiment of another screenshot including a selection menu of a subset of previously viewed channels.

FIG. 4 illustrates an embodiment of another screenshot 400 including a selection menu 402 of a subset of previously viewed channels. FIG. 4 will be discussed in reference to the entertainment system 100 of FIG. 1. In the screenshot 400, the visual indicator 406 highlights the icons 206-208, indicating that the user 108 may navigate between the channels associated with the icons 206-208. Thus, the user 108 may toggle between the associated channels.

Figure 5:
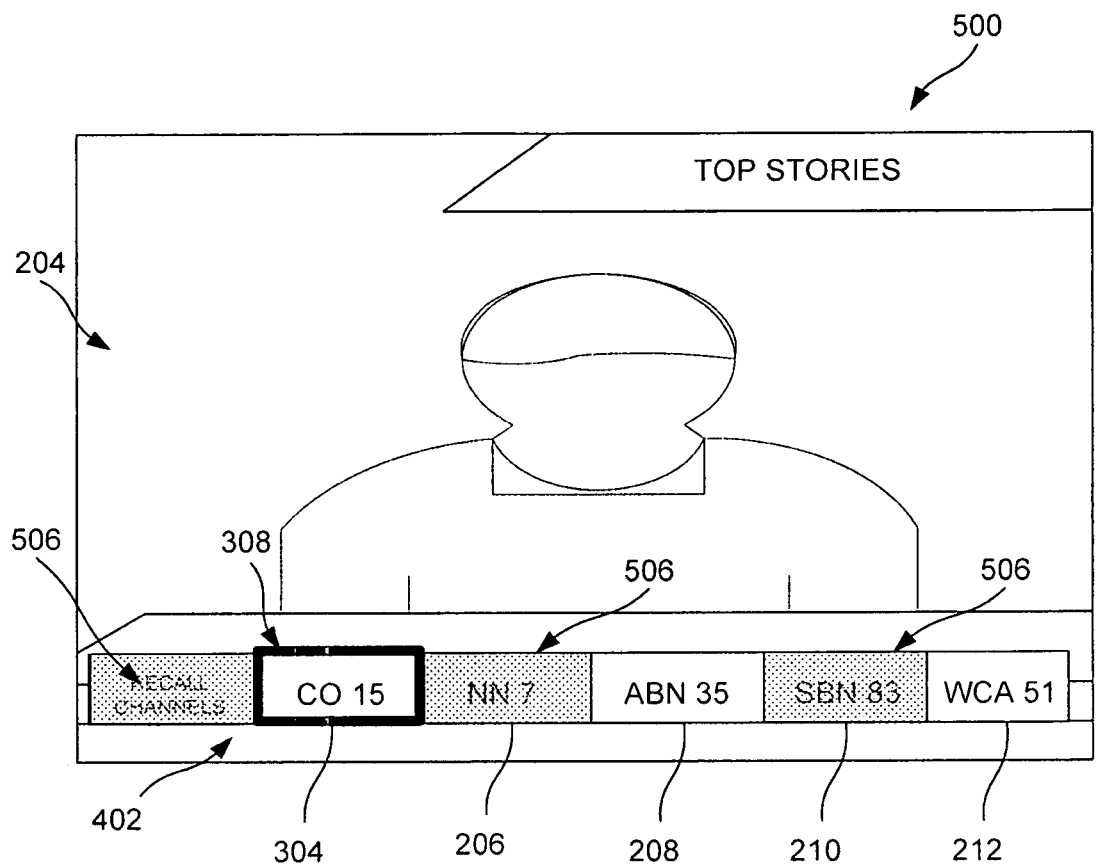
FIG. 5 illustrates an embodiment of another screenshot including a selection menu of a subset of previously viewed channels.

The subset of previously viewed channels may also include a non-contiguous subset of previously channels. FIG. 5 illustrates an embodiment of another screenshot 500 including a selection menu 502 of a subset of previously viewed channels. FIG. 5 will be discussed in reference to the entertainment system 100 of FIG. 1. In selection menu 502, the visual indicator 506 highlights the icons 304, 208 and 214, indicating that a user 108 may navigate between the three channels associated with the icons. Thus, a user 108 may depress a recall button or scroll along a touch pad of the remote control 106 to navigate the subset of previously viewed channels.

Figure 6:
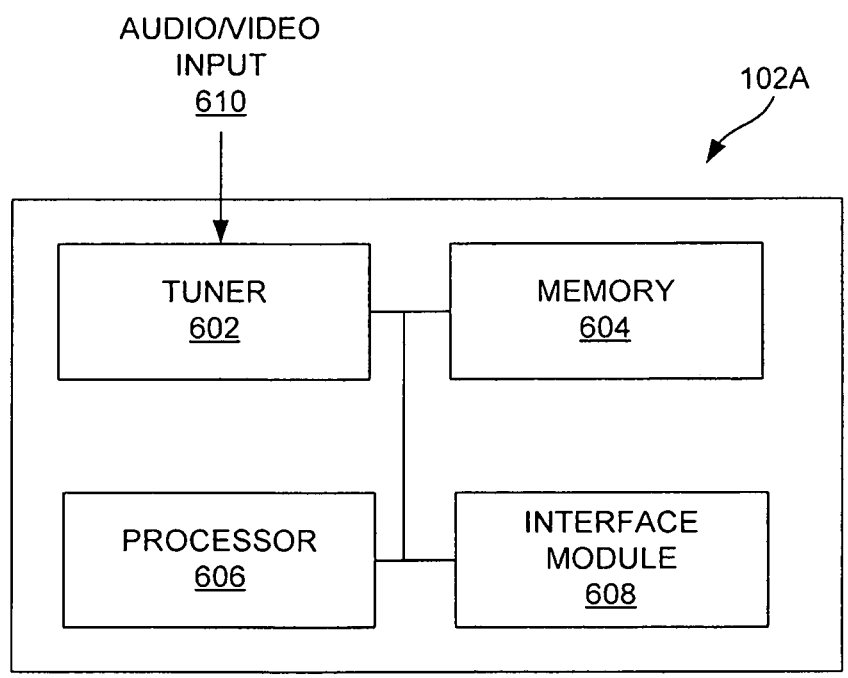
FIG. 6 illustrates an embodiment of a television receiver of FIG. 1.

FIG. 6 illustrates an embodiment of a television receiver of FIG. 1. FIG. 6 will be discussed in reference to the entertainment system 100 illustrated in FIG. 1. The television receiver 102A includes a tuner 602, a memory 604, a processor 606 and an interface module 608. Each of these components will be discussed in greater detail below. The television receiver 102A may include other elements, components or devices which are not illustrated for the sake of brevity.

The tuner 602 is operable to receive an audio/video input 610 from a content source. More particularly, the tuner 602 receives and tunes a television signal including television programming. The tuner 602 may receive an over-the-air broadcast, a direct broadcast satellite signal, a cable television signal or an internet protocol television (IPTV) signal and tune the audio/video input 610 to extract the selected television programming.

The memory 604 is operable to store settings and other data of the television receiver 102A. The memory 604 may comprise any type of memory appropriate for storing data utilized to control the operation of the television receiver 102A. Exemplary memory 604 includes semiconductor random access memory (RAM), flash memory, magnetic memory and the like. The memory 604 is at least operable to store data regarding a plurality of previously viewed channels.

The processor 606 is operable to control the operation of the television receiver 102A. The processor 606 may be a single processing device or a plurality of processing devices that cooperatively operate to control the operation of the television receiver 102A. The processor 606 may include various components or modules for processing and outputting audio/video content. Exemplary components or modules for processing audio/video content include a demodulator, a decoder, a decompressor, a conditional access module and a transcoder module.

The processor 606 processes the audio/video input 610 to generate an audio/video output stream. The audio/video output stream is outputted to the display device 104 (see FIG. 1) for presentation to a user. The processor 606 may incorporate circuitry to output the audio/video streams in any format recognizable by the display device 104, including composite video, component video, Digital Visual Interface (DVI) and High-Definition Multimedia Interface (HDMI). The processor 606 may also incorporate circuitry to support multiple types of these or other audio/video formats. In at least one embodiment, as described above, the television receiver 102A may be integrated with the display device 104, and the processor 606 may be operable to control the presentation of the audio/video output stream.

The interface module 608 is operable to wirelessly receive data from the remote control 106. The interface module 608 may communicate with the remote control 106 utilizing any type of IR or RF communication link. In at least one embodiment, the interface module 608 receives a key code from the remote control 106, and responsively provides the key code to the processor 606. In some embodiments, the interface module 608 may receive positional information from a scrolling device of the remote control 106, e.g., a touch pad, scroll wheel or the like.

Some of the data received by the interface module 608 may request to change a channel outputted by the television receiver 102A. The processor 606 stores data to the memory 604 to reflect a list of previously viewed channels as well as the presently viewed channels. The user 108 then requests to activate a recall function of the television receiver 102A, e.g., by pressing a recall button of the remote control. The processor responsively outputs a selection menu that includes the plurality of previously viewed channels. The selection menu may optionally include the presently viewed channels.

The interface module 608 receives input, from the remote control 106, selecting one of the previously viewed channels of the selection menu. The processor 606 processes the input and responsively commands the tuner 602 to tune to the selected previously viewed channel. The processor further outputs a video signal associated with the selected one the plurality of previously viewed channels for presentation by the display device 104. Thus, a user 108, through the improved television receiver 102A, may navigate through a plurality of previously viewed channels, to experience multiple channel recall function during their viewing experience.

Those of ordinary skill in the art will appreciate that the various functional elements 602 through 604 shown as operable within the television receiver 102A may be combined into fewer discrete elements or may be broken up into a larger number of discrete functional elements as a matter of design choice. Thus, the particular functional decomposition suggested by FIG. 6 is intended merely as exemplary of one possible functional decomposition of elements within the television receiver 102A.

Figure 7:
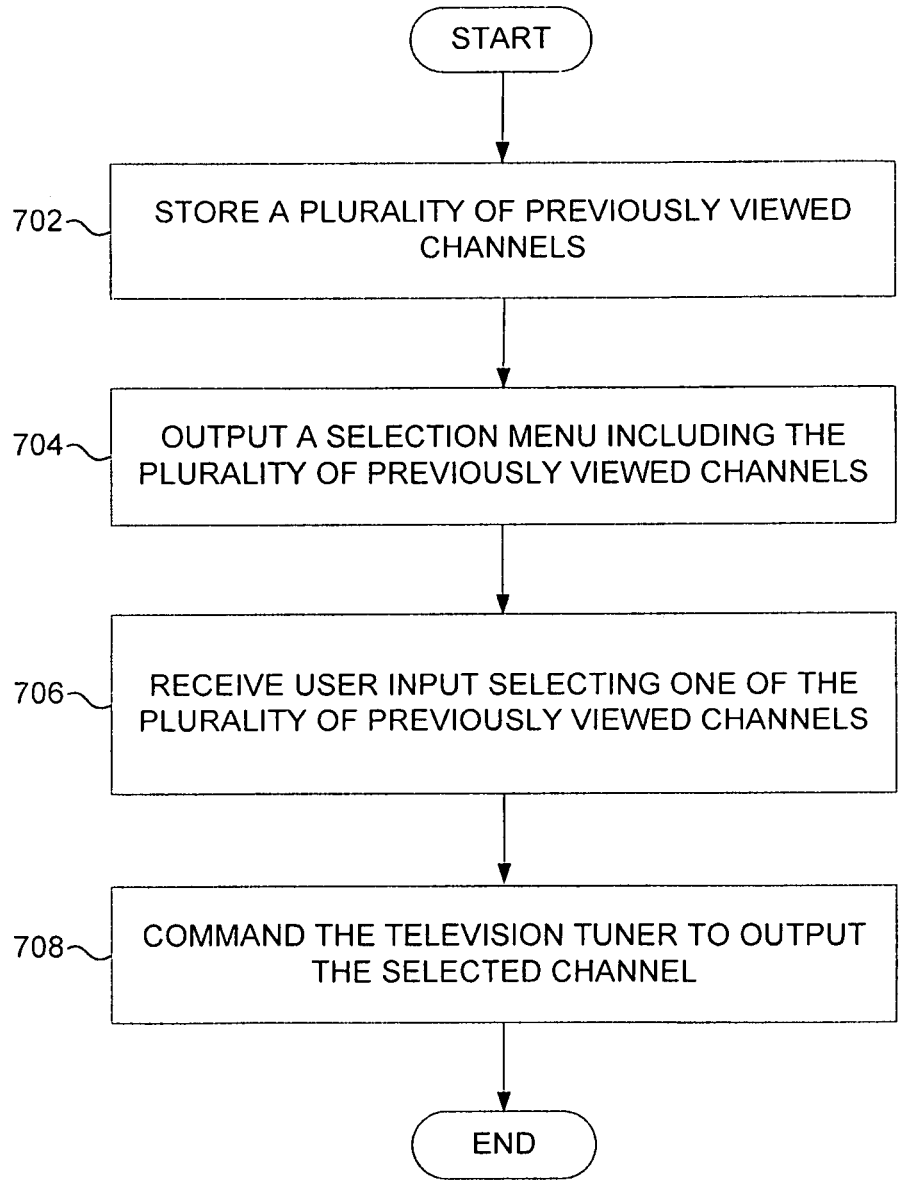
FIG. 7 illustrates an embodiment of a process for providing multiple channel recall on a television receiver.

FIG. 7 illustrates an embodiment of a process for providing multiple channel recall on a television receiver. More particularly, the process of FIG. 7 provides a user with a selection menu of previously viewed channels, and allows the user to navigate the selection menu to select one of the previously viewed channels for viewing. The process of FIG. 7 may include other operations not illustrated for the sake of brevity.

The process includes storing a plurality of previously viewed channels (operation 702). The process further includes outputting a selection menu including the plurality of previously viewed channels (operation 704). The selection menu may be outputted responsive to a user request to activate a recall function. For example, a user may press a recall button of a remote control or may scroll using a touch pad, arrow keys of the like of a remote control.

The process further includes receiving user input selecting one of the plurality of previously viewed channels (operation 706). For example, the user may manipulate a cursor using a remote control to highlight a particular channel, and press an enter button or actuate a trigger of the remote control to select a particular channel. The process further includes commanding a television tuner to output the selected one of the plurality of previously viewed channels (operation 708). Thus, the user may switch from a previously viewed channel to one of a plurality of previously viewed channels, experiencing multiple channel recall on a television receiver.

Although specific embodiments were described herein, the scope of the invention is not limited to those specific embodiments. The scope of the invention is defined by the following claims and any equivalents therein.

We claim:

1. A method of providing multiple channel recall on a television receiver, the method comprising:
    storing N previously and most recently viewed channels in a list, wherein N represents an integer, wherein each of the N previously and most recently viewed channels represents a unique television channel of N most recently viewed channels that was previously viewed by a user;
    receiving user selections that indicate a user-configurable subset of M channels of the list of the N previously and most recently viewed channels, wherein M represents an integer that is less than N;
    outputting a selection menu including the list of N previously and most recently viewed channels and the user-configurable subset of M channels of the list of previously and most recently viewed channels, wherein only the user-configurable subset of M channels of the list of N previously and most recently viewed channels is available for selection in the selection menu, channels of the list of N previously and most recently viewed channels but not of the user-configurable subset of M channels being non-selectable;
    receiving a user input selecting one of the user-configurable subset of M channels of the list of N previously and most recently viewed channels from the selection menu; and
    commanding a television tuner to output the selected one of the user-configurable subset of M channels of the list of N previously and most recently viewed channels.

2. The method of claim 1, wherein the list of N channels is populated with the previously and most recently viewed channels in a first in first out (FIFO) manner.

3. The method of claim 1, wherein outputting the selection menu further comprises:
    outputting the presently viewed channel as one of the channels selectable within the selection menu.

4. The method of claim 3, further comprising:
    outputting a visual indicator highlighting the subset of M channels of the list of N previously and most recently viewed channels;
    outputting a cursor within the selection menu, the cursor moveable only within the user-configurable subset M channels of the list of N previously and most recently viewed channels; and
    receiving first user input requesting to manipulate a position of the cursor, wherein the position of the cursor determines the selected one of the M channels of the user-configurable subset of the list of N previously and most recently viewed channels output by the television tuner.

5. The method of claim 4, wherein the user-configurable subset of M channels of the list of N previously and most recently viewed channels includes a first previously viewed channel and the presently viewed channel, and wherein the method further comprises:
    receiving user input requesting to alternate between the first previously viewed channel and the presently viewed channel.

6. The method of claim 4, further comprising:
    receiving third user input requesting to change a composition of the user-configurable subset of M channels of the list of N previously and most recently viewed channels.

7. The method of claim 1, wherein outputting the selection menu further comprises:
    outputting an icon associated with each channel of the list of N previously and most recently viewed channels, wherein the icon comprises a selection feature configurable by the user to include or exclude the previously-viewed channel from the user-configurable subset of M channels.

8. A system comprising:
a remote control including:
   an input device that receives user input;
   a transmitter that transmits the user input; and
a television receiver including:
   a tuner that receives television programming from a programming source;
   a memory that stores a plurality of previously and most recently viewed channels;
   a processor communicatively coupled to the memory and communicatively coupled to the tuner that outputs a presently viewed channel for presentation by a display device, the processor further overlaying a selection menu including representations of the plurality of previously and most recently viewed channels, a user-configurable subset of the previously and most recently viewed channels, wherein the user-configurable subset consists of less than all of the plurality of previously and most recently viewed channels, and the presently viewed channel, the selection menu further comprising a manipulatable cursor, and wherein only the user-configurable subset of the selection menu is highlighted for selection and is selectable using the manipulatable cursor, channels of the plurality of previously and most recently viewed channels but not of the user-configurable subset being non-selectable; and
   an interface module communicatively coupled to the processor that receives the user input from the transmitter, the user input manipulating a position of the cursor to thereby receive user selections from the selection menu that indicate the user-configurable subset of the selection menu and selecting one of the previously and most recently viewed channels from the user-configurable subset of the selection menu;
   the processor further operable to process the user input and responsively command the tuner to tune to the selected one of the user-configurable subset of the plurality of previously and most recently viewed channels and operable to output a video signal associated with the selected one of the user-configurable subset of the plurality of previously and most recently viewed channels for presentation by the display device.

9. The system of claim 8, wherein the input device comprises a touch pad.

10. The system of claim 9, wherein the processor outputs a visual indicator highlighting the user-configurable subset of the plurality of previously and most recently viewed channels, and wherein the position of the cursor is manipulatable only within the subset of the plurality of previously and most recently viewed channels.

11. The system of claim 10, wherein the subset of the plurality of previously and most recently viewed channels includes a first previously and most recently viewed channel and the presently viewed channel, and wherein movement across the touch pad responsively toggles the output of the processor between the first previously and most recently viewed channel and the presently viewed channel.

12. The system of claim 10, wherein the interface module receives third user input from the input device requesting to change the user-configurable subset of the plurality of previously and most recently viewed channels, the processor outputting a second visual indicator highlighting the changed subset of the plurality of previously and most recently viewed channels based on the third user input.

13. A method of providing multiple channel recall on a television receiver, the method comprising:
   storing a plurality of previously viewed channels in a list, wherein each of the previously viewed channels represents a unique television channel that was previously viewed by a user;
   outputting a first selection menu including the list of previously viewed channels, wherein only a first subset of the list of previously viewed channels are-user selectable, channels of the list of previously viewed channels that are output in the first selection menu but that are not of the first subset being non-selectable;
   receiving user selections from the first selection menu that indicate a second, user-configured subset of the list of previously-viewed channels;
   outputting a second selection menu including the list of previously viewed channels and the second, user-configured subset of the list of previously viewed channels, wherein only the second, user-configured subset of the list of previously viewed channels is available for selection in the second selection menu, channels of the list of previously viewed channels that are output in the second selection menu but that are not of the second, user-configured subset being non-selectable;
   receiving a user input selecting one of the second, user-configured subset of the plurality of previously viewed channels from the second selection menu; and
   commanding a television tuner to output the selected one of the second, user-configured subset of the plurality of previously viewed channels.

14. The method of claim 13, wherein the first subset comprises a currently viewed channel and a most recently viewed channel.

15. The method of claim 14 further comprising, after receiving the user selections, reconfiguring the first subset into the second, user configured subset.

* * * * *